United States Patent Office 3,282,550
Patented Nov. 1, 1966

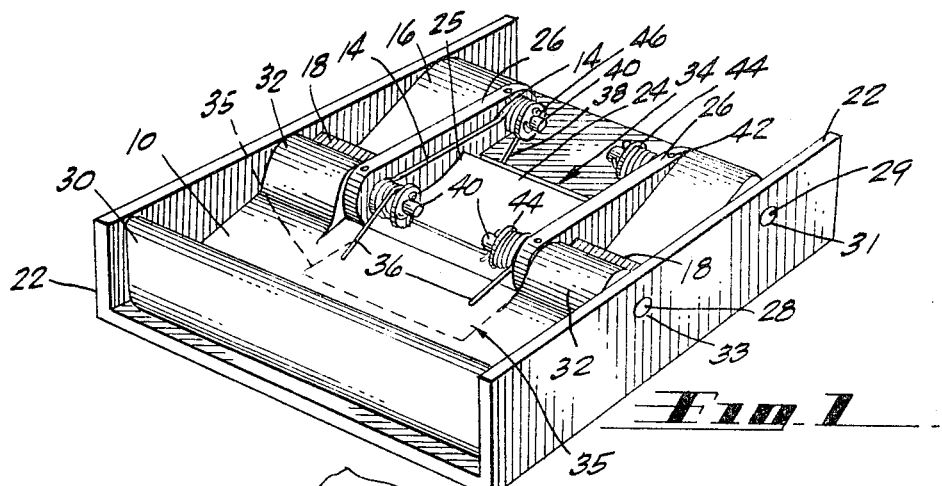

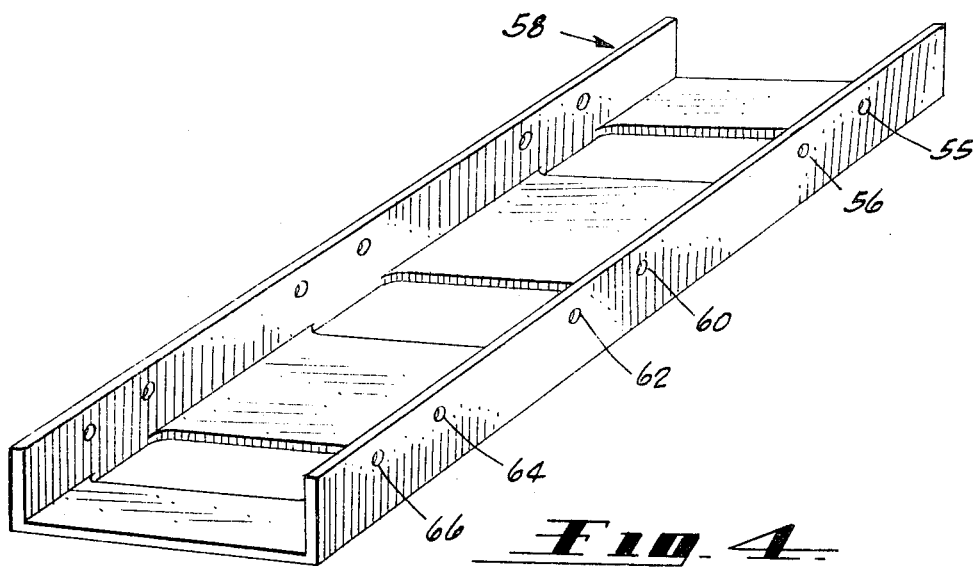

3,282,550
CARGO PALLET LATCH
Robert A. Warren, Long Beach, Calif., assignor to Douglas Aircraft Company, Inc., Santa Monica, Calif.
Filed Jan. 18, 1965, Ser. No. 426,109
9 Claims. (Cl. 248—361)

This invention relates to vehicular cargo restraining apparatus including latch assemblies, and finding one use in restraining cargo carrying pallets against movement in vehicle cargo compartments.

Cargo is typically loaded on and secured to pallets for disposition in vehicles such as cargo aircraft, trucks and trains as well as in other storage areas, and the pallets are normally held in desired positions by suitable restraining apparatus which grip edges or other portions of the pallets. One type of apparatus which may be used for this purpose is described in Patent No. 3,210,038, Cargo Latch, by Howard E. Bader et al.; assigned to the assignee of the present invention and application. The cargo-bearing pallets are frequently moved on rollers or like structures that are commonly attached to a floor of an aircraft or other vehicle and the restraining apparatus must engage the pallets following disposition thereof in their final loaded position. It is generally desirable to provide such restraining apparatus with a low profile when not in position to engage a pallet to permit the pallets to be moved thereover. It is also generally desirable to avoid a necessity for physical removal of the restraining apparatus from the vehicle before unloading, or the replacement thereof after the pallets and their cargo are loaded.

The latch disclosed in the above-identified co-pending application is useful for holding two cargo pallets, one located in front of and the other behind the latch. However, a latch is also needed by the loading door of the airplane, which may be at the end or side of the fuselage to hold the last cargo pallet loaded therein. Such an end latch assembly should be of simple construction and easily operated. This invention provides an end latch having a low profile to enable cargo pallets to be rolled thereover and which is easily engaged with the edge of a cargo pallet. The latch assembly is manipulated to its engaging position by an operator using only one hand. The latch is disengaged by an operator pressing on a lever with his foot so that he does not have to stoop over and his hands are free, thereby enabling him to hold the heavy cargo pallet from rolling or to perform other operations. The latch assembly of this invention includes a frame structure with several sets of holes for holding the operating mechanism in any one of several locations along the housing to accommodate pallets of different sizes. Only one hand is required to disengage or replace the assembly from the frame and the disengagement is easily performed without any tools and in a very easy manner.

Accordingly, one object of the present invention is to provide an end latch assembly for holding a cargo pallet in a storage area.

Another object is to provide a latch assembly which can be engaged with one hand and disengaged by foot pressure on a pedal.

Yet another object is to provide a latch assembly wherein the operating mechanism can be removed from its housing in a very simple manner.

Still another object is to provide a latch assembly which readily engages pallets of different sizes.

The above and other objects of the invention are attained by a latch assembly comprising a channel-shaped housing or frame to which is pivotally mounted a latch lever for engagement with cargo pallets. The latch lever is normally biased toward a disengaged position wherein it lies flat with a low profile, all parts thereof being no higher than the sides of the channel-shaped frame.

When the latch lever is raised to an engaging position by lifting it with the hand, a pedal pivotally mounted on the housing automatically locks the lever in the engaging position. The latch lever is moved to its disengaged position merely by pressing on the pedal, which causes its disengagement and allows a spring to move the latch lever downwardly.

Th latch assembly mechanism is easily removed from the channel-shaped frame by squeezing together two plate-like members. Each plate is fixed to two axles which hold one side of the latch lever and one side of the pedal on the frame. To prevent the accidental removal of the latch assembly from the channel-shaped frame, a flat retaining spring is disposed btween the axle-holding plates to prevent their being squeezed together unless the spring is pushed out of the way. However, the arrangement of the spring and holding plates is such that the spring can be pressed and the plates moved together with only one hand.

In one embodiment of the invention, the frame includes several sets of holes for holding the latch mechanism in any one of several positions, to accommodate pallets of different sizes. For example, in an airplane with a side loading door, the latch is placed in front of the door and grips the side of the last pallet. Standard pallet sizes include pallets with widths of 108 inches, 118 inches and 125 inches. To switch from a 108 to 125 inch pallet, the latching mechanism is removed from one set of holes in the frame and replaced in another set located 8½ inches away.

The novel features that are considered characteristic of this invention are set forth with particularity in the appended claims. The invention itself both as to its organization and method of operation, as well as additional objects and advantages thereof will best be understood from the following description when read in connection with the accompanying drawings, in which:

FIGURE 1 is a pictorial view of an end latch constructed in accordance with the invention, and shown in a retracted position;

FIG. 2 is a pictorial view of the latch of FIG. 1 shown in an engaging position wherein it is engaging the edge of a cargo pallet;

FIG. 3 is a top elevational view showing the latching mechanism disengaged from the frame thereof, for enabling its removal therefrom; and FIG. 4 is a perspective view of a frame structure or housing for a latching mechanism, for use with various sizes of pallets in a side loading airplane.

Reference is now directed to the drawings which show a channel-shaped housing or frame structure 22 which is held to the floor of a cargo holding space by studs or other fastening means (no shown). A latching mechanism disposed within the frame comprises a latch lever 10 for engaging pallets, and a pedal arrangement 34 for locking the lever in its engaging position. The lever 10 and pedal 34 are pivotally mounted to the frame 22, by axles 28 and 29. The latch lever 10 pivots to an upward, engaging position so that an engaging end 30 thereof can engage the edge of a pallet 12 as shown in FIG. 2. A locking end of the latch lever 10 is bifurcated so as to form two branches 32 and includes catch means or ratchets 18 formed on each branch. The pedal arrangement 34 includes two pawl arms 16 which engage the ratchets 18 of the latch lever when the lever is rotated upward to its pallet engagaing position. Two springs 14 bias the latch lever 10 towards its retracted position wherein the pallet engaging end 30 lies within the boundaries defined by the channel-shaped frame 22. The spring 14 also bias the pedal arrangement 34 so that the pawl arms 16 thereof tend to engage the ratchets 18 to automatically lock the lever 10 in position when it is rotated upward.

A foot pedal 35 of the pedal arrangement is fixed to each pawl arm 16. When the latch lever 10 is in the pallet engaging position, it can be automatically rotated downward to its retracted position by merely pushing downwardly on the foot pedal 35. Depressing the foot pedal 35 moves the pawl arms 16 downwardly and out of engagement with the ratchets 18, thereby enabling the springs 14 to rotate the latch lever 10 to its retracted position. The foot pedal 35 is so located, when the latch lever 10 is in its engaging position, as shown in FIG. 2, that an operator can easily depress it with his foot.

The latch lever 10 is pivotally mounted to the frame 22 by two axles 28, each of which projects through one branch 32 of the lever 10 and through a hole 33 formed in a side of the frame 22. Similarly, one axle 29 extends through one pawl arm 16 of the pedal arrangement and through a hole 31 formed in a side of the frame 22, to hold them together. Inner axle ends 40 of the axles 28 and 29 protrude inwardly from the branches 32 of the latch lever and from the pawl arms 16. Two axle joining members 26 are provided which join together the inner axle ends 40 on each side of the frame. Pins 42 extending through the members 26 and axle ends 40 hold them together. Washers 44 are disposed on the axle ends 40 and held by cotter pins 46, the washers serving to hold springs 14 on the axles. The springs 14 each comprise a long length of spring wire wound in coils about the inner axle ends 40 and including connecting spring wire portions extending between the coils. One spring end 36 lies against the latch lever 10 so as to apply spring force to bias the lever towards is retraced position. The other end 38 of the spring wire, extends underneath the pedal arm 35 to bias it upwardly. The pedal arm 35, which is fixed to the pawl arms 16, is therefore biased so that the pawl arms tend to move upwardly and engage the ratchets 18 of the latch lever when the latch lever is rotated to its pallet engaging position.

The length of the axles 28 and 29 is somewhat less than one-half the space between the sides of the frame. Thus, each of the two pairs of axles 28 and 29 can be moved together, so that none of the axles engage the sides of the frame 22. The entire latching mechanism can be removed from the channel-shaped frame. As previously mentioned, such a removal enables the latching mechanism to be readily relocated to another set of four holes within the frame 22 in order to engage a different size pallet or, in the case where a latching mechanism is defective, enables its replacement by a properly operating mechanism.

To remove the latching mechanism, the axles are moved together by grasping the two axle joining members 26 with the hands and squeezing them together. In order to prevent accidental removal of the latching mechanism from the frame, a flat spring 24 is provided having a free end disposed between joining members 26 to hold them a predetermined distance apart, whereby all of the axles 28 and 29 engage the holes 31 and 33 of the frame 22. In order to squeeze the axle joining members together, the free end 25 of the flat spring must be depressed. An operator may depress the free end 25 with his index finger while at the same time squeezing together the two joining members 26 with his middle finger and thumb, thereby removing the entire latching mechanism from the frame 22 with one hand. Much of the movement of the flat spring 24 when pressed, is opposed by the relatively light force of the end 38 of spring 14 instead of the flat spring itself.

The foot pedal 35 extends to a position whereby it is exposed when a latch lever 10 is in the engaging position, so that the foot pedal is easily located and depressed with the foot. In order for the foot pedal to be depressed a substanial amount to assure disengagement of the pawl arms 16 with the ratchets 18, and yet provide a latch assembly and housing of low profile, an aperture 54 is formed in the bottom of the frame 22, within which the foot pedal 35 can move when depressed.

The end cargo pallet latch of this invention is normally positioned at the end of a cargo holding space or in front of the loading doorway, so that it can be used to hold the last cargo pallet to be loaded into the storage area. The latch is allowed to lie in its retracted position shown in FIG. 1 during the loading of the pallets in the storage area, the cargo pallets rolling or sliding above the frame 22. After the last cargo pallet is loaded, the operator grasps the engaging end 30 of the latch lever 10 and rotates it upwardly toward its engaging position. When the latch lever 10 has been moved to its engaging position as shown in FIG. 2, the ratchets 18 have been moved past the ends of the pawl arms 16 and the pawl arms spring slightly upwardly under the biasing force of the ends 38 of the springs. When the operator releases the latch lever 10, it tends to move downwardly toward its retracted position, but the pawl arms 16 engage the ratchets 18 and prevent such movement. The engaging end 30 grasps the edge of the pallet 12 and prevents horizontal shifting and upward movement.

When cargo is to be unloaded from the storage area, the latch lever 10 must be rotated down to its retracted position. This movement is accomplished by an operator depressing the foot pedal 35 by stepping on it with his toe. A slight downward movement of the pedal arm 35 disengages the pawl arms 16 from the ratchets 18 and enables the latch lever 10 to move all the way down to its retracted position under the force of the ends 38 of the springs.

Three sizes of pallets, having widths of 108 inches, 118 inches and 125 inches are commonly used in aircraft. In those airplanes having side loading doors, it is convenient to provide means for shifting the latching mechanism outwardly toward the door when larger pallets are used. When changing from standard 108 inch pallets to standard 118 or 125 inch pallets the shifting is generally by 5 and 8½ inches, respectively. Accordingly, in the case of latch assemblies for side loading airplanes, a long frame may be used having sets of holes spaced longitudinally from each other to receive the latching mechanism. Such a latch assembly is illustrated in FIG. 4. The housing or frame 58 includes a set of holes 60 and 62 for use with 118 inch pallets, which are spaced 5 inches from the set 55 and 56 used for 108 inch pallets. Another set of holes 64 and 66 for 125 inch pallets is spaced 8½ inches from holes 55 and 56. The latching mechanism is removed from one set of holes and installed in another set by the method described hereinbefore.

While particular embodiments of the present invention have been shown and described, obviously many variations and modifications can be made therein. Accordingly, the invention is not limited to the particular embodiment shown, but only by a just interpretation of the following claims.

I claim:
1. A latch comprising:
   a frame;
   a latch lever having an inner end portion pivotally mounted on said frame and an engaging end portion, said lever being pivotable between an erect position and a retracted position;

ratchet means positioned on said inner end portion of said lever;

pawl arm means having a first end portion pivotally mounted on said frame and having a ratchet-engaging end portion located adjacent said inner end portion of said lever and movable past said ratchet means when said lever is rotatably moved to said erect position, for engaging said ratchet means and preventing pivoting of said lever to said retracted position;

first spring means for biasing said lever in a direction toward said retracted position;

second spring means for biasing said ratchet-engaging end portion of said pawl arm against said lever inner end portion, to cause said ratchet engaging end portion to lock said lever in said erect position; and pedal means associated with said pawl arm means for enabling the application of force to said pawl arm to cause its disengagement from said ratchet means.

2. A latch comprising:

a frame;

a lever pivotally mounted on said frame, said lever rotatable in a first direction for erection and rotatable in a second direction for retraction;

a pawl arm pivotally mounted on said frame;

a ratchet means formed on said lever, said ratchet means positioned for movement away from said point of pivotal mounting of said pawl arm when said lever is rotated to erection;

a ratchet engaging portion mounted on said pawl arm, said engaging portion positioned for movement past said ratchet means when said lever is rotated to said erect position; and spring means for biasing said lever in said first direction of rotation and for biasing said pawl arm in said second direction of rotation.

3. A latch comprising:

a frame having opposite sides;

a lever having a bifurcated inner end portion and an outer end portion;

first and second lever axles, each axle joining one branch of said bifurcated inner end portion to a different side of said frame;

a pawl arm having a bifurcated first end and having a second end, said second end including lever engaging means for preventing rotation of said lever in at least one direction;

first and second pawl arm axles, each joining one branch of said bifurcated first end of said pawl arm to a different side of said frame;

first and second joining members, each joined to one of said lever axles and one of said pawl arm axles which are joined to the same side of said frame; and separator means for separating said joining members to maintain said axles joined to said frame, said separator means being disengageable from said axle joining members to enable movement of said members toward each other, whereby to allow the disengagement of said axles from said frame.

4. A latch as defined in claim 3 wherein:

said separator means comprises a flat spring fixed to said pawl arm, said spring having a portion biased to a blocking position between said joining members, said portion being depressable to a non-blocking position.

5. A latch comprising:

a frame having opposite sides;

a lever having a bifurcated inner end portion and an outer end portion, said lever movable to an erection position and a free retraction position;

first and second lever axles, each axle joining one branch of said bifurcated inner end portion to a different side of said frame;

a pawl arm having a bifurcated first end and having a second end, said second end including lever engaging means for preventing rotation of said lever from said position of erection to said position of retraction;

first and second pawl arm axles, each joining one branch of said bifurcated first end of said pawl arm to a different side of said frame;

first and second axle joining members, each joined to one of said lever axles and one of said pawl arm axles which are joined to the same side of said frame;

separator means for separating said axle joining members to keep said axles joined to said frame, said separator means being disengageable from said axle joining members to enable their movement toward each other; and a spring having a first coil portion wound about one of said lever axles and a second coil portion wound about one of said pawl arm axles, having a first spring end portion engaged with said lever for biasing said lever towards said position of retraction, and having a second end portion positioned against said pawl arm for biasing said pawl arm against said lever.

6. A latch comprising:

a channel-shaped frame having sides defining upper latch boundaries;

a lever having a first lever end and a second lever end, said first lever end pivotally mounted between the sides of said frame and said second lever end formed with a pallet engaging portion, said lever rotatable between a position of retraction wherein said pallet engaging portion lies substantially within said upper latch boundaries of said frame and a position of erection wherein said pallet engaging portion extends past said upper latch boundaries of said frame;

pawl arm means pivotally mounted on said frame;

ratchet means formed on said lever; and ratchet engaging means formed on said pawl arm means for engaging said ratchet means when said lever is in said position of erection.

7. A latch as defined in claim 6 including:

pedal means fixed to said pawl arm means for enabling the disengagement of said pawl arm means from said ratchet means, said pedal means extending past a side of said lever means opposite said pawl arm means when said lever is in said position of erection, whereby to enable the facile disengagement of said pawl arm means from said ratchet means.

8. A latch mechanism adapted for mounting on a frame comprising:

a lever having a bifurcated inner end portion and an outer end portion;

first and second lever axles, each axle joining one branch of said bifurcated inner end portion to a different side of said frame;

a pawl arm having a bifurcated first end and having a second end, said second end including lever engaging means for preventing rotation of said lever in at least one direction;

first and second pawl arm axles, each joining one branch of said bifurcated first end of said pawl arm to a different side of said frame;

first and second joining members, each joined to one of said lever axles and one of said pawl arm axles which are joined to the same side of said frame; and separator means for separating said joining members to maintain said axles joined to said frame, said separator means being disengageable from said axle joining members to enable movement of said members toward each other, whereby to allow the disengagement of said axles from said frame.

9. A latch comprising:

a fixed member;

a latching means pivotally mounted to said fixed member, said latching means being movable from an inoperative position to an operative position;

a locking means movably secured to said fixed member, said locking means being so located as to engage said latching means and prevent movement of said latching means to said inoperative position when said latching means is in said operative position; and first spring means biasing said latching means to said inoperative position, second spring means biasing said locking means into engagement with said latching means.

References Cited by the Examiner

UNITED STATES PATENTS

| 3,181,886 | 5/1965 | Blunden et al. | 280—179 |
| 3,204,581 | 9/1965 | Davidson | 105—369 |
| 3,210,038 | 10/1965 | Bader et al. | 248—361 |

CLAUDE A. LE ROY, *Primary Examiner.*

J. F. FOSS, *Assistant Examiner.*